United States Patent
Tsurube

(10) Patent No.: US 10,701,352 B2
(45) Date of Patent: Jun. 30, 2020

(54) IMAGE MONITORING DEVICE, IMAGE MONITORING METHOD, AND RECORDING MEDIUM

(71) Applicant: Panasonic Intellectual Property Management Co., Ltd., Osaka (JP)

(72) Inventor: Tomoyuki Tsurube, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/656,205

(22) Filed: Oct. 17, 2019

(65) Prior Publication Data
US 2020/0053354 A1    Feb. 13, 2020

Related U.S. Application Data

(63) Continuation of application No. PCT/JP2018/023612, filed on Jun. 21, 2018.

(30) Foreign Application Priority Data

Aug. 3, 2017   (JP) ................................. 2017-150375

(51) Int. Cl.
*H04N 17/00*   (2006.01)
*H04N 5/235*   (2006.01)
(Continued)

(52) U.S. Cl.
CPC ......... *H04N 17/002* (2013.01); *G06T 7/0002* (2013.01); *H04N 5/2351* (2013.01);
(Continued)

(58) Field of Classification Search
CPC .... H04N 5/2353; H04N 5/235; H04N 17/002; H04N 17/00; H04N 5/2351; H04N 7/181;
(Continued)

(56) References Cited

U.S. PATENT DOCUMENTS

| 2012/0194689 A1* | 8/2012 | Kodama | H04N 5/2357 348/220.1 |
| 2013/0300869 A1* | 11/2013 | Lu | H04N 7/18 348/148 |

FOREIGN PATENT DOCUMENTS

JP   3807331 B   8/2006

OTHER PUBLICATIONS

International Search Report of PCT application No. PCT/JP2018/023612 dated Aug. 21, 2018.

* cited by examiner

*Primary Examiner* — Sherrie Hsia
(74) *Attorney, Agent, or Firm* — Greenblum & Bernstein, P.L.C.

(57) ABSTRACT

An image monitoring device includes a maximum value and minimum value calculator, a small-luminance-difference determiner, a small-luminance-difference-block counter, and a dirt adherence determiner. The maximum value and minimum value calculator calculates, for each of a plurality of blocks set in one frame of a video signal obtained through a lens, a maximum luminance value and a minimum luminance value of a plurality of pixels forming each of the plurality of blocks. The small-luminance-difference determiner determines whether or not each of the blocks has a small luminance difference, by comparing a difference between the maximum luminance value and the minimum luminance value with a first threshold. The small-luminance-difference-block counter counts a number of blocks having the small luminance difference in the one frame. The dirt adherence determiner determines whether or not dirt is adherent to the lens, based on the number of blocks having the small luminance difference.

5 Claims, 3 Drawing Sheets

(51) Int. Cl.
 *H04N 7/18* (2006.01)
 *G06T 7/00* (2017.01)
(52) U.S. Cl.
 CPC ............... *G06T 2207/10016* (2013.01); *G06T 2207/30168* (2013.01)
(58) Field of Classification Search
 CPC ............ H04N 7/18; G06T 2207/10016; G06T 2207/30168; G06T 7/0002
 USPC .... 348/180, 187, 118, 119, 148, 150, 221.1, 348/234–236, 238, 362, 364, 366; 382/154, 107, 103, 104, 149
 See application file for complete search history.

IMAGE MONITORING DEVICE, IMAGE MONITORING METHOD, AND RECORDING MEDIUM

CROSS-REFERENCE TO RELATED APPLICATIONS

This application is a continuation of the PCT International Application No. PCT/JP2018/023612 filed on Jun. 21, 2018, which claims the benefit of foreign priority of Japanese patent application No. 2017-150375 filed on Aug. 3, 2017, the contents all of which are incorporated herein by reference.

BACKGROUND

1. Technical Field

The present disclosure relates to an image monitoring device, an image monitoring method, and a recording medium on which an image monitoring program is stored.

2. Description of the Related Art

A monitoring device has been proposed which analyzes an image obtained by a camera mounted to a vehicle to detect another vehicle or a person. A method has also been proposed which detects dirt adherent to a camera because dirt, such as mud, adhered to the camera hinders accurate detection (for example, Japanese Patent No. 3807331). In the method disclosed in Japanese Patent No. 3807331, inter-frame differences of a video signal obtained at different timings are sequentially accumulated, and it is determined that dirt is adherent to the lens when a region having an accumulated value less than or equal to a predetermined value is large.

SUMMARY

An image monitoring device according to an aspect of the present disclosure includes a maximum value and minimum value calculator, a small-luminance-difference determiner, a small-luminance-difference-block counter, and a dirt adherence determiner. The maximum value and minimum value calculator calculates, for each of a plurality of blocks set in one frame of a video signal obtained through a lens, a maximum luminance value and a minimum luminance value of a plurality of pixels forming each of the plurality of blocks. The small-luminance-difference determiner determines whether or not each of the plurality of blocks has a small luminance difference, by comparing a difference between the maximum luminance value and the minimum luminance value with a first threshold. The small-luminance-difference-block counter counts a number of blocks having the small luminance difference in one frame. The dirt adherence determiner determines whether or not dirt is adherent to the lens, based on the number of blocks having the small luminance difference.

In an image monitoring method according to an aspect of the present disclosure, first, for each of a plurality of blocks set in one frame of a video signal obtained through a lens, a maximum luminance value and a minimum luminance value of a plurality of pixels forming each of the plurality of blocks are calculated. Next, whether or not each of the plurality blocks has a small luminance difference is determined, by comparing a difference between the maximum luminance value and the minimum luminance value with a first threshold. Moreover, a number of blocks having the small luminance difference in the one frame is counted. Then, whether or not dirt is adherent to the lens is determined based on the number of blocks having the small luminance difference.

An image monitoring program according to an aspect of the present disclosure causes a computer to function as the maximum value and minimum value calculator, the small-luminance-difference determiner, the small-luminance-difference-block counter, and the dirt adherence determiner.

A non-transitory recording medium according to an aspect of the present disclosure stores the image monitoring program that is readable by a computer.

According to the present disclosure, dirt adhered to a camera can be detected accurately even if the luminance of a video signal changes due to exposure control and without time delay compared to a method in which inter-frame differences are accumulated.

DETAILED DESCRIPTION OF PREFERRED EMBODIMENTS

The method disclosed in Japanese Patent No. 3807331 cannot always detect dirt accurately. Moreover, since the determination is made by accumulating inter-frame differences, determination of dirt adherence takes time.

The present disclosure provides an image monitoring device, an image monitoring method, an image monitoring program, and a recording medium which are capable of accurately detecting dirt adherent to a camera without time delay.

Hereinafter, an embodiment of the present disclosure will be specifically described with reference to the drawings.

Figure 1:
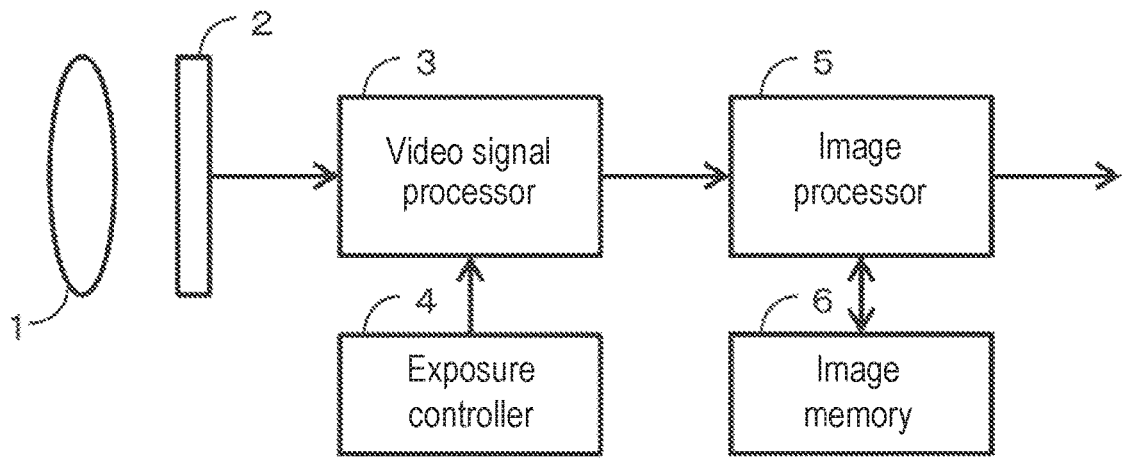
FIG. 1 is a block diagram illustrating a schematic configuration of an image monitoring device according to an embodiment of the present disclosure.

FIG. 1 is a block diagram illustrating a schematic configuration of an image monitoring device according to the present embodiment. The image monitoring device includes video signal processor 3, exposure controller 4, image processor 5, and image memory 6. Video signal processor 3 receives a video signal which is generated from light of image formed on imaging element 2 through lens 1. Based on the control of exposure controller 4, video signal processor 3 then performs amplification processing and the like on the video signal in response to external light. The video signal output from video signal processor 3 is stored in image memory 6 for each frame. Image processor 5 determines whether or not dirt is adherent to lens 1 by using one frame stored in image memory 6.

Figure 2:
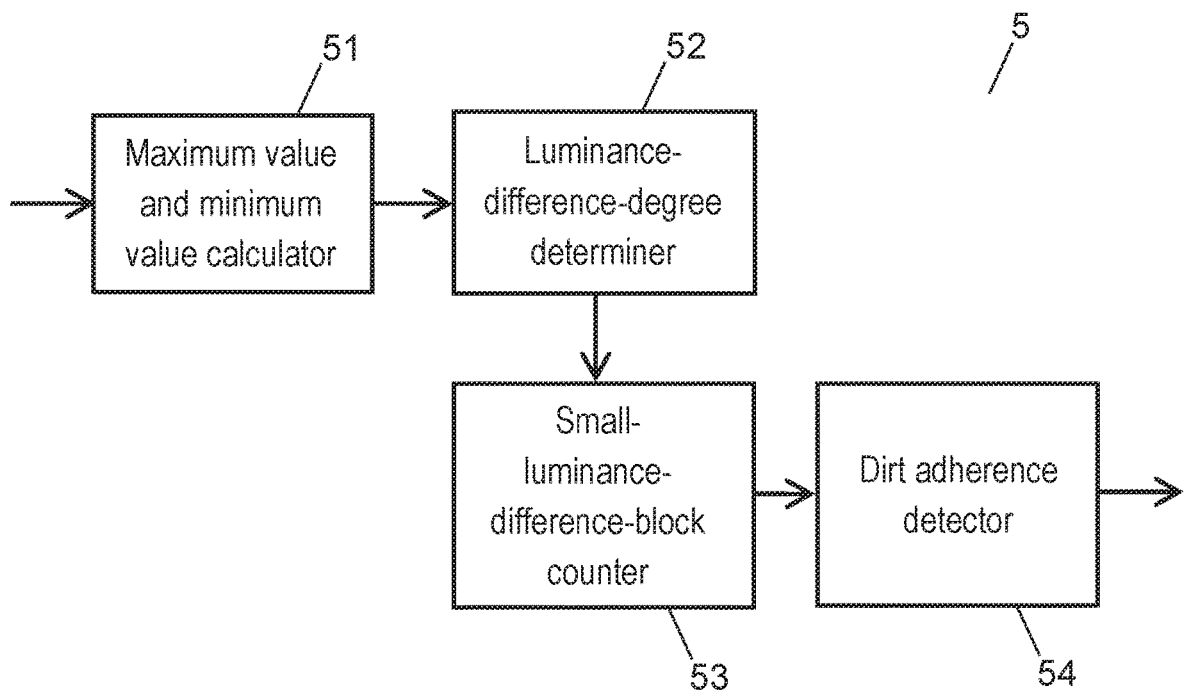
FIG. 2 is a block diagram illustrating a detailed configuration of an image processor in the image monitoring device illustrated in FIG. 1.
Figure 3:
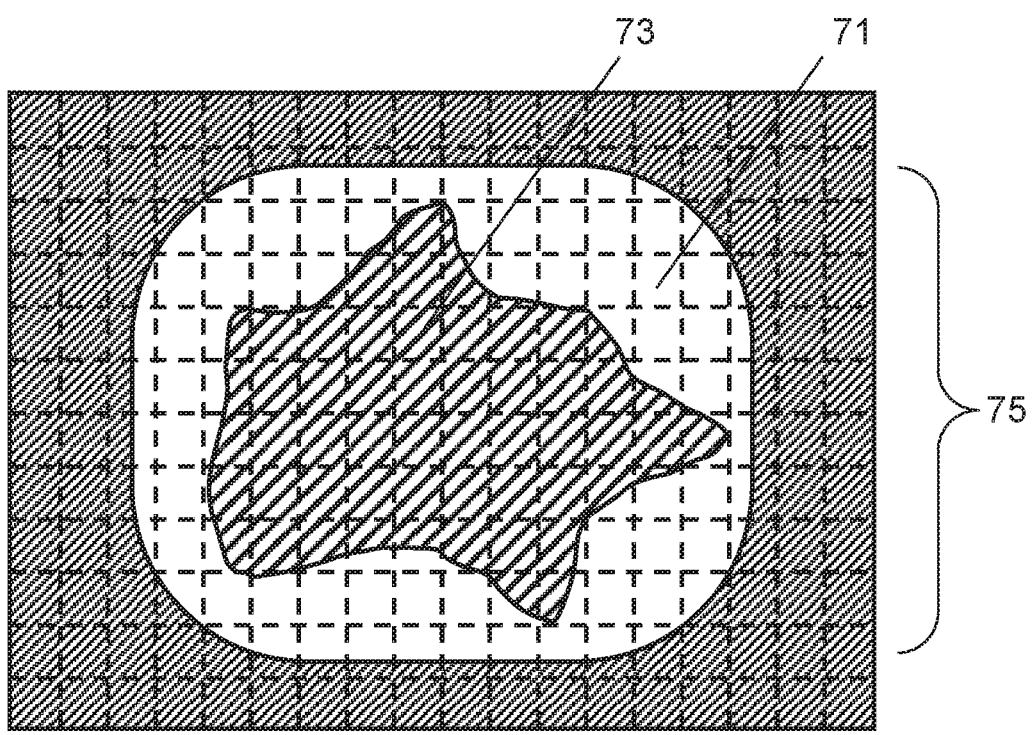
FIG. 3 illustrates blocks set in one frame of a video signal obtained through a lens.

FIG. 2 is a block diagram illustrating a detailed configuration of image processor 5. FIG. 3 illustrates blocks set in one frame of a video signal obtained through a lens. As illustrated in FIG. 2, image processor 5 includes maximum value and minimum value calculator 51, luminance-differ-
} ence-degree determiner 52, small-luminance-difference-block counter 53, and dirt adherence detector 54.

As illustrated in FIG. 3, an image of one frame in a video signal is virtually divided into a plurality of blocks 71. In other words, the plurality of blocks 71 are set in one frame. Each of blocks 71 includes a plurality of pixels. As one example, when one frame includes 640×480 pixels, each block 71 may include, for example, 32×32 pixels or 64×64 pixels. Image processor 5 then processes predetermined effective region 75, in the video signal, in which a bumper and the like is not shot.

Maximum value and minimum value calculator 51 illustrated in FIG. 2 calculates, for each of the plurality of blocks 71 to be processed, the maximum luminance value and the minimum luminance value of the plurality of pixels forming each of the plurality of blocks 71. Luminance-difference-degree determiner 52 determines whether or not block 71 to be processed has a small luminance difference, based on the maximum luminance value and the minimum luminance value. Small-luminance-difference-block counter 53 counts the number of blocks 71 having the small luminance difference in the one frame. Dirt adherence detector 54 determines whether or not dirt 73 is adherent to lens 1, based on the number of blocks 71 having the small luminance difference.

Note that part or all of the functional units illustrated in FIG. 1 and FIG. 2 may be implemented by hardware or software. In the latter case, each functional unit can be implemented by the processor executing a predetermined image monitoring program. Moreover, all of the structural elements in FIG. 1 may be included in one device or separately included in a plurality of devices.

Figure 4:
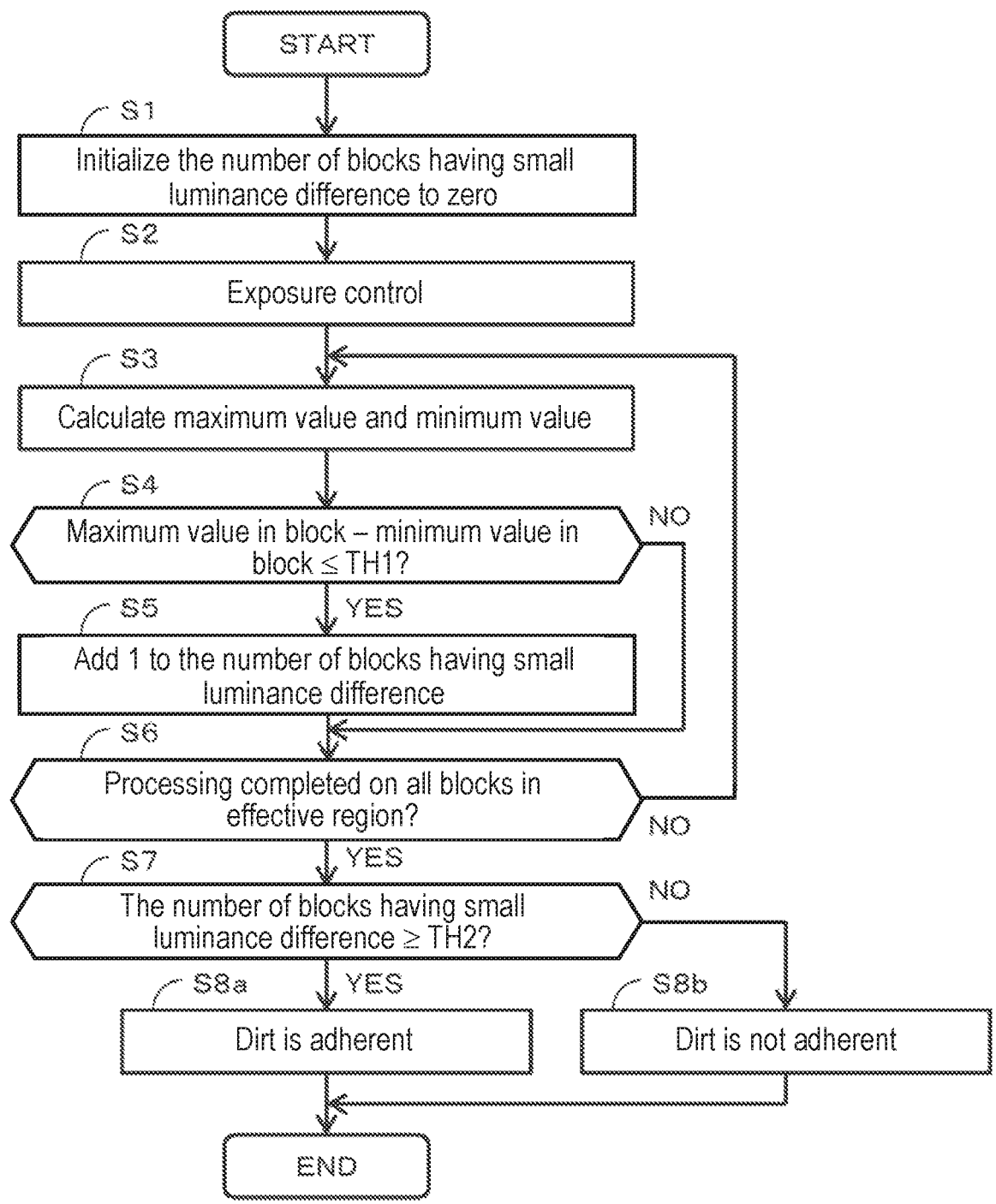
FIG. 4 is a flowchart of an example of a processing operation in the image monitoring device illustrated in FIG. 1.

FIG. 4 is a flowchart of an example of a processing operation of the image monitoring device in FIG. 1. First, small-luminance-difference-block counter 53 in image processor 5 initializes the number of blocks having the small luminance difference to zero in advance (Step S1).

Video signal processor 3 processes a video signal output from imaging element 2, based on the control of exposure controller 4. For example, when the entire frames are dark, video signal processor 3 amplifies the video signal so that the entire frames become brighter (Step S2). Accordingly, the video signal subjected to the exposure control is input to image processor 5 and stored in image memory 6. Thereafter, dirt adherence detection is performed on one frame of the video signal.

Maximum value and minimum value calculator 51 in image processor 5 determines one block in one frame as a block to be processed. Maximum value and minimum value calculator 51 then calculates the maximum luminance value and the minimum luminance value of a plurality of pixels included in the block to be processed (Step S3).

Subsequently, luminance-difference-degree determiner 52 determines whether or not the block to be processed has a small luminance difference, based on the maximum luminance value and the minimum luminance value. More specifically, when a difference calculated by subtracting the minimum luminance value from the maximum luminance value is less than or equal to predetermined threshold value TH1 (first threshold value) (YES in Step S4), luminance-difference-degree determiner 52 determines that the block to be processed has a small luminance difference. In contrast, when the difference is greater than threshold value TH1 (NO in Step S4), luminance-difference-degree determiner 52 determines that the block to be processed does not have a small luminance difference.

When luminance-difference-degree determiner 52 determines that the block to be processed has the small luminance difference (YES in Step S4), small-luminance-difference-block counter 53 regards the block to be processed as a block having the small luminance difference, and adds only one to the number of blocks having the small luminance difference (Step S5). The above processing is performed on all blocks in the one frame (NO in Step S6), and when it is completed (YES in Step S6), the number of blocks having the small luminance difference in the one frame is counted as a result.

Dirt adherence detector 54 determines whether or not dirt is adherent to lens 1, based on the number of blocks having the small luminance difference in the one frame. More specifically, when the number of blocks having the small luminance difference in the one frame is greater than or equal to predetermined threshold value TH2 (second threshold value) (YES in Step S7), dirt adherence detector 54 determines that dirt is adherent to lens 1 (Step S8a). In contrast, when the number of blocks having the small luminance difference is less than threshold value TH2 (NO in Step S7), dirt adherence detector 54 determines that dirt is not adherent to lens 1 (step S8b).

In the manner described above, information about whether or not dirt is adherent to lens 1 is output from the image monitoring device.

When exposure control is performed on a video signal, when the entire of a frame become bright, the dirt adhered to lens 1 also becomes bright, and when the entire of a frame become dark, the dirt adhered to lens 1 also becomes dark. In other words, the brightness of the dirt may change depending on the frames. Therefore, dirt adherence determination performed using a plurality of frames leads to a lower determination accuracy.

In contrast, in the present embodiment, the dirt adherence determination is performed using only one frame without using a plurality of frames. Therefore, even in the case where exposure control is performed, it is possible to perform the dirt adherence determination accurately without time delay.

The above embodiment is for providing an example of the technique of the present disclosure, and thus various modifications, interchanges, additions, omissions, and the like are possible in the scope of the claims and equivalent scope thereof.

The present disclosure is useful, for example, as an image monitoring device which analyzes an image obtained from a camera mounted to a vehicle to detect another vehicle or a person.

What is claimed is:
1. An image monitoring device comprising:
a maximum value and minimum value calculator configured to calculate, for each of a plurality of blocks set in one frame of a video signal obtained through a lens, a maximum luminance value and a minimum luminance value of a plurality of pixels forming each of the plurality of blocks;
a small-luminance-difference determiner configured to determine whether or not each of the plurality of blocks has a small luminance difference, by comparing a difference between the maximum luminance value and the minimum luminance value with a first threshold;
a small-luminance-difference-block counter configured to count a number of blocks having the small luminance difference in the one frame; and
a dirt adherence determiner configured to determine whether or not dirt is adherent to the lens, based on the number of blocks having the small luminance difference.

2. The image monitoring device according to claim 1, wherein the video signal has been subjected to exposure control.

3. The image monitoring device according to claim 1, wherein the dirt adherence determiner is configured to determine whether or not the dirt is adherent to the lens, by comparing the number of blocks having the small luminance difference with a second threshold.

4. An image monitoring method comprising:
calculating, for each of a plurality of blocks set in one frame of a video signal obtained through a lens, a maximum luminance value and a minimum luminance value of a plurality of pixels forming each of the plurality of blocks;
determining whether or not each of the plurality of blocks has a small luminance difference, by comparing a difference between the maximum luminance value and the minimum luminance value with a first threshold;
counting a number of blocks having the small luminance difference in the one frame; and
determining whether or not dirt is adherent to the lens, based on the number of blocks having the small luminance difference.

5. A non-transitory recording medium on which a computer-readable image monitoring program is stored, the computer-readable image monitoring program causing a computer to function as:
a maximum value and minimum value calculator configured to calculate, for each of a plurality of blocks set in one frame of a video signal obtained through a lens, a maximum luminance value and a minimum luminance value of a plurality of pixels forming each of plurality of the blocks;
a small-luminance-difference determiner configured to determine whether or not each of the plurality of blocks has a small luminance difference, by comparing a difference between the maximum luminance value and the minimum luminance value with a first threshold;
a small-luminance-difference-block counter configured to count the number of blocks having the small luminance difference in the one frame; and
a dirt adherence determiner configured to determine whether or not dirt is adherent to the lens, based on the number of blocks having the small luminance difference.

* * * * *